United States Patent Office 3,062,822
Patented Nov. 6, 1962

3,062,822
HETEROCYCLIC ARSENOSO COMPOUND AND METHOD OF PRODUCING THE SAME
John Controulis, Grosse Pointe Farms, Mich., assignor to Parke, Davis & Company, Detroit, Mich., a corporation of Michigan
No Drawing. Filed Jan. 31, 1961, Ser. No. 85,967
3 Claims. (Cl. 260—271)

The present invention relates to 5-arsenoso-8-methylquinoline of the formula

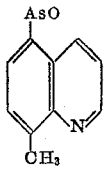

to acid-addition salts thereof, and to the method for the production of such compounds.

In accordance with the invention, 5-arsenoso-8-methylquinoline is produced by reducing 8-methyl-5-quinoline arsonic acid. This reduction can be carried out in an aqueous solvent such as water and at a temperature below about 100° C. As reducing agents sulfurous acid, sodium-thiosulfate, or reagents which produce these compounds in solution may be used, as well as other reagents capable of accomplishing the required reduction. According to the present invention, the preferred method for production of 5-arsenoso-8-methylquinoline involves the reduction of 8-methyl-5-quinoline arsonic acid by adding potassium iodide and sulfur dioxide to an acidic aqueous solution containing the arsonic acid. The sulfur dioxide is preferably bubbled into the stirred reaction mixture containing the other reagents. A large excess of sulfur dioxide is usually employed and the reaction is preferably carried out at between 0–25° C.

The acid-addition salts of the invention can be obtained by reacting 5- arsenoso-8-methylquinoline with an organic or inorganic acid. Some examples of the many salts which can be produced in this manner are the mineral acid salts such as the hydrochloride, hydrobromide, sulfate, hydriodide, and phosphate salts; salts of organic carboxylic acids such as the acetate, benzoate, citrate, maleate, phthalate, and tartrate; salts of benzene sulfonic acids such as the benzenesulfonate and p-toluenesulfonate; and salts of other strong acids such as the sulfamate.

5-arsenoso-8-methylquinoline and its non-toxic acid-addition salts are useful in the treatment of *Ascaris suum* infections in swine. They are also useful in the treatment of *Nematospiroides dubius*, Ascaris, and *Hymenolepis nana* infections in mice and consequently are of value in the control of these diseases in breeding colonies of white mice. They may be administered orally in any of the customary pharmaceutical forms or in admixture with the feed of the animals. The non-toxic acid-addition salts referred to above are those which are not substantially more toxic in the aforementioned animals than an equal weight of the free base of 5-arsenoso-8-methylquinoline.

The invention is illustrated by the following example:

*Example*

8-methyl-5-quinoline arsonic acid, 6.0 g., is suspended in 120 ml. water and 24 ml. of concentrated hydrochloric acid is added. A solution of 1.2 g. potassium iodide in 25 ml. water is then added, the mixture placed in an ice bath and sulfur dioxide bubbled into the stirred mixture for three hours. Ammonium carbonate is then added gradually to adjust the pH to about 8, whereupon a white precipitate appears. The 5-arsenoso-8-methylquinoline is collected and washed with water. It is purified by suspending the solid in 100 ml. water, adding 10 ml. concentrated hydrochloric acid dropwise, filtering, and reprecipitating by adjusting the solution to pH 8 with concentrated ammonium hydroxide. The solid is collected, washed with water, and dried in vacuo at 50° C. for two hours; M.P. 165–167° C.

The 5-arsenoso-8-methylquinoline hydrochloride is prepared by treating an ether solution of the free base with one equivalent of hydrogen chloride. Removal of the solvent leaves the hydrochloride salt.

In order to prepare the citrate salt, a solution of the free base in isopropyl alcohol is mixed thoroughly with a solution of one equivalent citric acid in isopropyl alcohol. Removal of the solvent under reduced pressure leaves the citrate salt.

I claim:
1. A compound of the class consisting of 5-arsenoso-8-methylquinoline and its acid-addition salts.
2. 5-arsenoso-8-methylquinoline.
3. Process for the production of 5-arsenoso-8-methylquinoline which comprises reacting 8-methyl-5-quinoline arsonic acid with sulfur dioxide in the presence of water at a temperature in the range from 0 to 25° C.

References Cited in the file of this patent

Frankel et al.: Chemische Berichte, vol. 46, pages 2546–2550 (1913).
Blankenstein et al.: Jour. Am. Chem. Soc., vol. 76, pages 3211–3213 (1954).